United States Patent [19]

Dell et al.

[11] Patent Number: 5,465,262
[45] Date of Patent: Nov. 7, 1995

[54] METHOD AND STRUCTURE FOR PROVIDING ERROR CORRECTION CODE AND AUTOMATIC PARITY SENSING

[75] Inventors: Timothy J. Dell, Colchester, Vt.; Jimmy G. Foster, Boca Raton, Fla.

[73] Assignee: International Business Machines Corporation, Armonk, N.Y.

[21] Appl. No.: 227,444

[22] Filed: Apr. 14, 1994

Related U.S. Application Data

[63] Continuation-in-part of Ser. No. 188,245, Jan. 28, 1994, and a continuation-in-part of Ser. No. 187,859, Jan. 28, 1994, Pat. No. 5,379,304.

[51] Int. Cl.[6] .................................................... G06F 11/10
[52] U.S. Cl. ............................................ 371/49.3; 371/49.1
[58] Field of Search ................................ 371/37.3, 37.7, 371/40.1, 40.4, 51.1, 49.1, 49.3

[56] References Cited

U.S. PATENT DOCUMENTS

| | | | |
|---|---|---|---|
| 4,850,892 | 7/1989 | Clayton et al. | |
| 5,052,001 | 9/1991 | Jeppesen, III et al. | 371/49.3 |
| 5,058,115 | 10/1991 | Blake et al. | 371/40.1 |
| 5,070,450 | 12/1991 | Holman, Jr. et al. | |
| 5,127,014 | 6/1992 | Raynham | 371/37.3 |
| 5,235,602 | 8/1993 | Klim | 371/49.1 |
| 5,241,643 | 8/1993 | Durkin et al. | |
| 5,355,377 | 10/1994 | Venkidu et al. | 371/51.1 |
| 5,367,526 | 11/1994 | Kong | 371/51.1 |

*Primary Examiner*—Roy N. Envall, Jr.
*Assistant Examiner*—Steven R. Garland
*Attorney, Agent, or Firm*—Calfee, Halter & Griswold

[57] ABSTRACT

A SIMM is provided which adds ECC onto a computer system, which system does not have ECC capabilities. The SIMM has ECC on board. The SIMM also has logic to sense whether the system is an "even" parity or "odd" parity system. Parity of the written data bytes is checked, and check bits used for the ECC are manipulated to check parity on the read cycle responsive to the sensed parity of the system. During the read cycle, parity is generated by the logic corresponding to the sensed system parity, and ECC is performed.

11 Claims, 4 Drawing Sheets

METHOD AND STRUCTURE FOR PROVIDING ERROR CORRECTION CODE AND AUTOMATIC PARITY SENSING

RELATED APPLICATION

This is a continuation-in-part of application Ser. No. 08/188,245, filed Jan. 28, 1994, entitled "Method and Structure for Providing Error Correction Code for Each Byte on SIMMs, and a continuation-in-part of application Ser. No. 08/187,859, filed Jan. 28, 1994, now U.S. Pat. No. 5,379,304 entitled "Method and Structure for Providing Error Correction Code and Parity for Each Byte on SIMMs.

FIELD OF THE INVENTION

This invention relates generally to handling of parity on single inline memory modules (SIMMs) which can be used in computer systems, which SIMMS do not store parity bits, but which systems may generate and check either odd or even parity. In certain embodiments, this invention relates to providing error correction code on each byte of a data word written to and from a computer system SIMM as a part of a multiple byte data word or as a single-byte data word and which SIMMs can be used on computer systems which do not have or cannot change dynamically their wait states and which SIMMs can handle parity whether their computer system is configured to write odd parity or even parity.

BACKGROUND OF THE INVENTION

The integrity requirements for personal computer systems have grown rapidly in the past few years. At the present time, newer operating systems and applications require a great deal of memory, and the amount of memory which can be accommodated in personal computer systems continues to increase rapidly. Such personal computer systems have in the past typically been provided only with the capability of writing and checking parity—if even that. Moreover, some computer systems generate "odd" parity and some generate "even" parity. In such a case of parity, if an odd number of bits of memory is corrupted, the bad parity condition will be flagged, and generally the system will halt when the error is detected. This poses a significant problem since users can ill afford to have periodic system crashes and/or loss of data, and as the amount of memory increases, the possibility of such data corruption increases significantly. In the case of systems which do not write and check parity, corrupted data can cause malfunction of the system. Moreover, with the advent of large applications which normally require large amounts of memory, these are the most exposed to such a crash and data corruption.

As indicated above, until very recently most conventional current low end personal computer systems contained at best only parity SIMMs which can detect an odd number of bit errors, but cannot correct such errors. Moreover, a parity function cannot detect double or other even number bit errors.

One solution which has been proposed to eliminate system crash or corruption of data due to single-bit errors is to provide error correction code for use in computer systems which do not have error correction code capabilities internal thereto. Typically, this error correction code allows for the detection of most double-bit errors and the correction of all single-bit errors. These schemes are a significant improvement over purely parity SIMMs. One technique for utilizing ECC is the so-called 32/7-bit ECC algorithm. This ECC algorithm requires 7 check bits for each double word (i.e., 4 bytes or 32 bits, thus the designation 32/7). This results in a 39-bit wide memory SIMM required for each double word and associated 7-check bits (32 data bits+7 check bits). Thus, the widely-used 36-bit wide memory SIMM is not available to be used, although this is a conventional and popular size SIMM and is used with double words containing only parity bits which requires only 36 bits (32 data bits plus 4 parity bits). More importantly, many systems do not have wait states programmed either in the system or in the bus interface circuit, and thus read-modify-write (RMW) operations cannot be performed because of the additional time required from RMW. RMW is required when less than all of the bytes of a multiple data byte word are being written. For example, if only one byte of a four-byte data word is being rewritten, a RMW cycle must be performed to recalculate and generate new check bits or the check bits associated with the entire 32 bits of data will be in error.

Thus, in the case of systems configured to write less than all the bytes of a multiple byte data word (which is typical) and where ECC has been attempted, the systems or at least the interface circuit has to be modified to provide for the necessary delays to perform a RMW cycle when the ECC algorithm uses all of the data bits and generate check bits such as in the 32/7 bit ECC algorithm.

In the application Ser. No. 08/187,859, filed Jan. 28, 1994 (Atty. Docket BC9-94-003), an improved ECC on SIMM is disclosed which allows writing of single byte words and which SIMMs are compatible with systems which do not have wait states necessary for RWM cycles and wherein parity of the written data is checked. If bad parity is detected such bad parity is flagged on the read cycle. However, in this disclosed system, the SIMM must "know" whether the system is configured to check either "odd" parity or "even" parity. Thus, a given SIMM is useful only in one or the other type of parity systems. This requires not only two different types of SIMMs, but knowledge on the part of the SIMM user or installer which parity is being generated by the system on which it is to be installed.

SUMMARY OF THE INVENTION

According to the present invention, a SIMM and method of operating the SIMM are provided wherein the SIMM has error correction code on board and is compatible with computer systems not having error correction code and which computer systems need not dynamically change their wait states. The SIMM has logic circuitry to detect whether the system is an "odd" parity or "even" parity system. Parity of the written data is checked. If bad parity is detected, the generated check bits are manipulated to show such bad parity on the read cycle. Also, proper parity (i.e., either "odd" or "even") is generated when the stored data is read and delivered to the computer system where it can be checked.

DESCRIPTION OF THE PREFERRED EMBODIMENT

The preferred embodiment will be described in the environment of an IBM Personal Computer using an Intel 80386 or 80486 microprocessor and with single in-line memory (SIMMs) having dynamic random access memory (DRAM) chips to provide and control the memory function. (A SIMM is sometimes referred to as a DRAM card which means the DRAM and all chips and circuits on the SIMM.) For the purpose of this description, the system will be described as it is used with a CPU capable of generating parity bits for the data bytes that it writes and also reading and comparing parity information read from storage. The CPU and its associated system will not have error correction code logic contained within the CPU system. Moreover, the CPU and associated system generates parity bits, and it does not matter whether the system generates "odd" parity or "even" parity; i.e., the invention can be used with either type of system.

Figure 1:
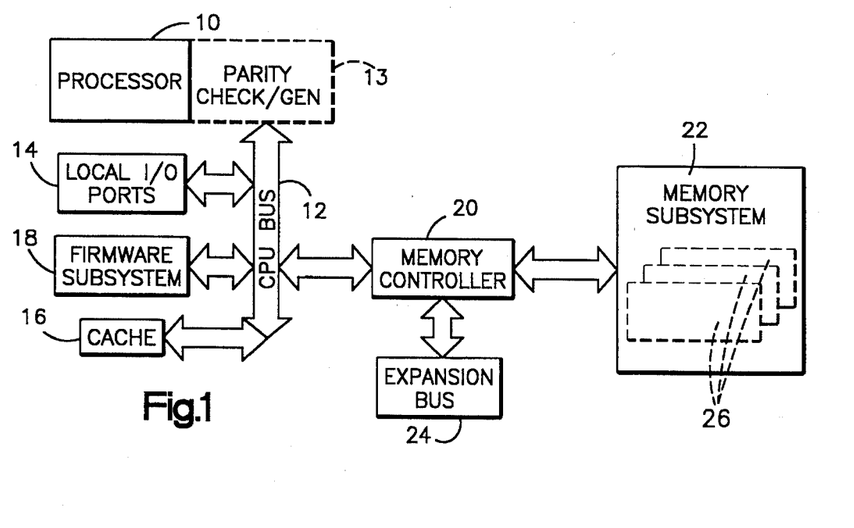
FIG. 1 is a high-level diagram showing the interconnects of a personal computer with a bus and an add-on memory cards according to this invention.

As can be seen in FIG. 1, there is provided a CPU 10 which is connected to a CPU or system bus 12. A parity generation and check unit 13 preferably is provided which also generates or checks parity of data being either written by or read by the CPU 10 to or from the bus 12. This can be either "odd" or "even" parity. The CPU bus 12 may also have local I/O ports 14, CACHE memory 16, and firmware subsystems 18 associated therewith. A memory controller 20 is also connected to the system bus 12, coupling it to a memory subsystem 22, and also normally to an expansion bus 24 if one is present. The memory subsystem 22 is typically comprised of one or more SIMMs 26, each of which is provided with DRAM chips and ASIC chips having error correction code. It is to be understood that the system just described is illustrative of systems on which the present invention can be used since one feature or aspect of the present invention is the provision of a SIMM card having parity checking and generations which can be utilized on virtually any system CPU and system having the capacity of receiving non-ECC SIMMs as add-on memory.

Figure 2:
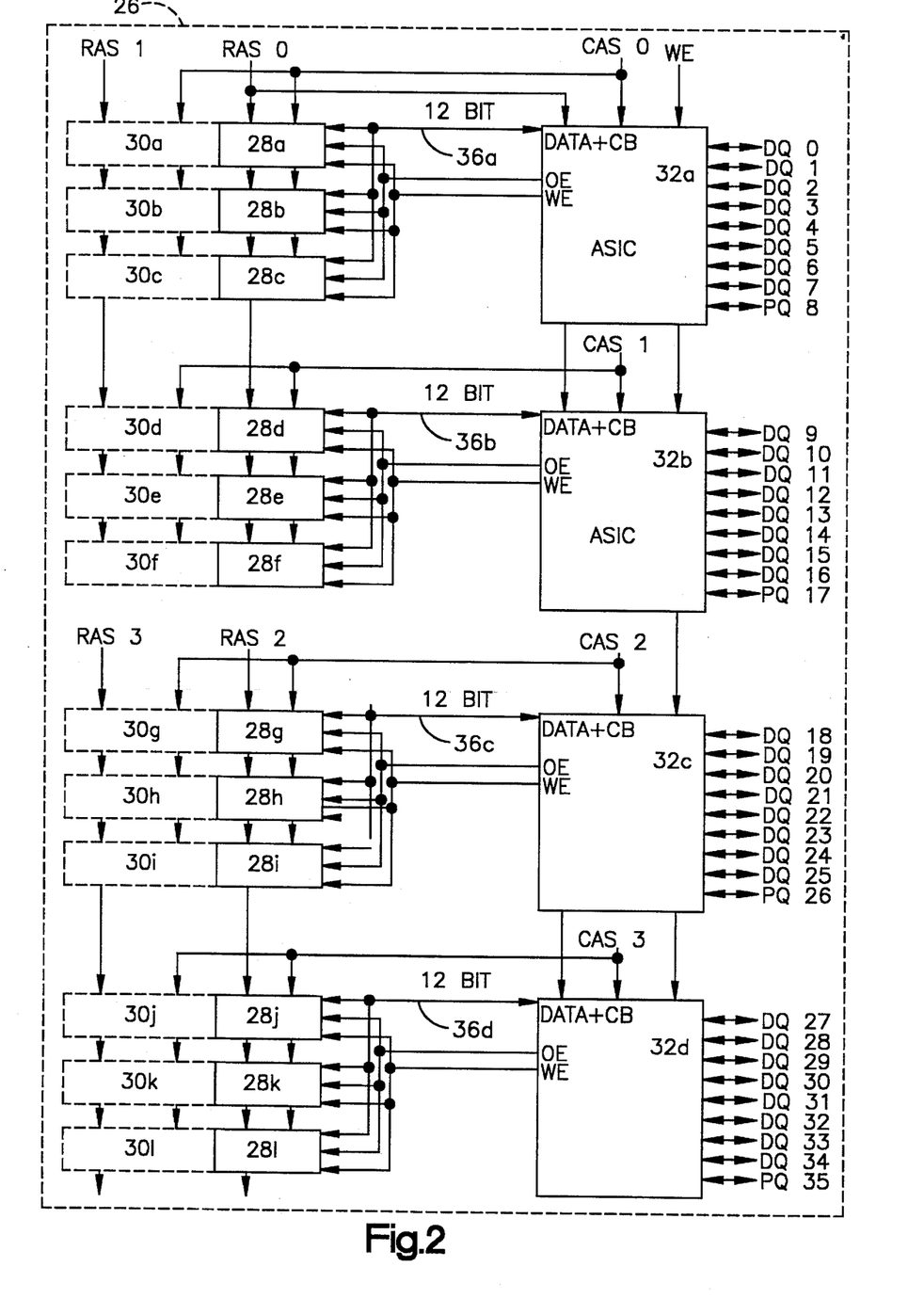
FIG. 2 is a high-level schematic representation of a SIMM card with ECC capabilities according to this invention connected to a computer system bus.

As indicated above, the CPU 10 is capable of writing data onto the bus 12 which in turn will be conveyed to the correct memory address in subsystem 22 by the memory controller 20. Upon writing data by the CPU 10, parity bits are generated for each byte of information written to memory by the parity generating and checking device 13 which also checks parity on information read from the memory subsystem 22 during a read cycle to determine parity error as will be described presently. The memory controller also provides the necessary signals, such as Row Activation Strobe (RAS), Column Activation Strobe (CAS), Write Enable (WE), and on some systems Output Enable (OE), and Byte Select (BS), etc., to the memory subsystem 22. The memory controller reads and writes both data and parity to each of the SIMMs 26, also as shown in FIG. 2. It should be understood that this invention is applicable to a wide variety of SIMMs having many different form factors. For example, it can be used in conjunction with the following SIMM forms: 72 pin×32; 72 pin× 36; 168 pin×64; 168 pin×72; 88 pin DRAM card; 68 pin DRAM card; 68 pin PCMCIA card, and 72 pin small outline DRAM card.

The error correction code logic includes logic which will check the parity bits written by the CPU on a "write" cycle and manipulate the check bits if bad parity is detected to show bad parity when read. The logic will also regenerate parity bits for each byte fetched on a read cycle.

Referring now to FIG. 2, a 72 pin SIMM 26 constructed according to this invention is shown. The SIMM 26 has a plurality of DRAMs 28a–28l. These are conventional 1M×4 DRAM chips which are commercially available. The 1M×4 DRAMs have 4 data I/O pins (DQ 1–4) and $2^{20}$ addresses. Thus, each series of 3 DRAM chips can receive 12 data bits, i.e., 28a, 28b, 28c can each receive a 4-bit wide data field, and thus together have a 12-bit wide bus. DRAM 28d, 28e and 28f also each are 1M×4 and together form a 12-bit wide data bus. The same is true for DRAMs 28g–28i, and DRAM 28j–28l. These type of DRAMs used on SIMMs are conventional for add-on memory modules and need not be described further. Other DRAMs such as 256K×4; 4M×4; 16M×4, etc., can also be used. If desired, the DRAMs can be formed in a stacked configuration as shown in dotted lines, thus having a second DRAM chip 30a–30l, each stacked respectively on the corresponding DRAM chip 28a–28l. This configuration as shown in dotted lines does in fact provide a more dense memory if desired.

Also provided on the SIMM are 4 ASIC (application specific integrated circuit) chips 32a, 32b, 32c and 32d. As can be seen in FIG. 2, various lines coming from the memory controller 20 bring the various signals such as RAS, CAS and WE. Also, a bus between the SIMM 28 and the memory controller 20 provides for interchange of data between the SIMM 26 and CPU 10. In this particular format, a 36-bit wide bus is used which delivers 8 data bits and 1 parity bit to each ASIC chip 32a, 32b, 32c and 32d. The ASIC chips 32a–32d provide, among other things, the logic needed to perform the read and write functions of the data to the DRAMs 26a–26l, and in so doing generate check bits, the check bits being generated such that there are 4 check bits generated for each byte of data. Each data byte (8 bits) together with the generated 4 check bits from the ASIC chip 32a are stored in DRAMs 28a, 28b and 28c, four bits in each DRAM for a total of 12 bits, i.e., a single byte plus 4 check bits. The same is true for ASIC chips 32b, 32c and 32d with respect to DRAM 28d–28f, 28g–28i, and 28j–28l, respectively. Thus, it will be appreciated that the arrangement and configuration of the SIMM 26 as shown allows a 4-byte data word to be written and the ECC check bits generated individually for each byte and each byte with its associated check bits stand individually. Therefore, if during any write cycle less than the entire four byte data word is being written or rewritten, this can be done without doing a read-modify-write cycle which would be required if all of the data bytes participated in writing all of the check bits such as is common in the 32/7 algorithm. Hence, a wait state need not be programmed into the computer system with its inherent loss of performance, including the processor or memory controller, but rather during each write operation check bits are generated, and during each read operation check bits are regenerated as syndrome bits and error correction made on each byte individually on each read operation.

The logic and generation of the bits will be described with respect to the ASIC chip 32a, in combination with the DRAM chips 28a, 28b and 28c. It is to be understood that the same operations take place with respect to the ASIC chip 32b and the DRAMs 28d, 28e and 28f, ASIC chip 32c in combination with DRAMs 28g, 28h and 28i, and ASIC chip 32d in combination with DRAMs, 28j, 28k and 28l. Thus, each ASIC receives 8 bits of data plus 1 parity bit on the 36-bit bus, and included in the logic of each ASIC chip 32 the circuitry generates 4 check bits from the 8 data bits supplied thereto with the check bits being generated specifically with the data bits only of 1 byte of data.

Figure 3A:
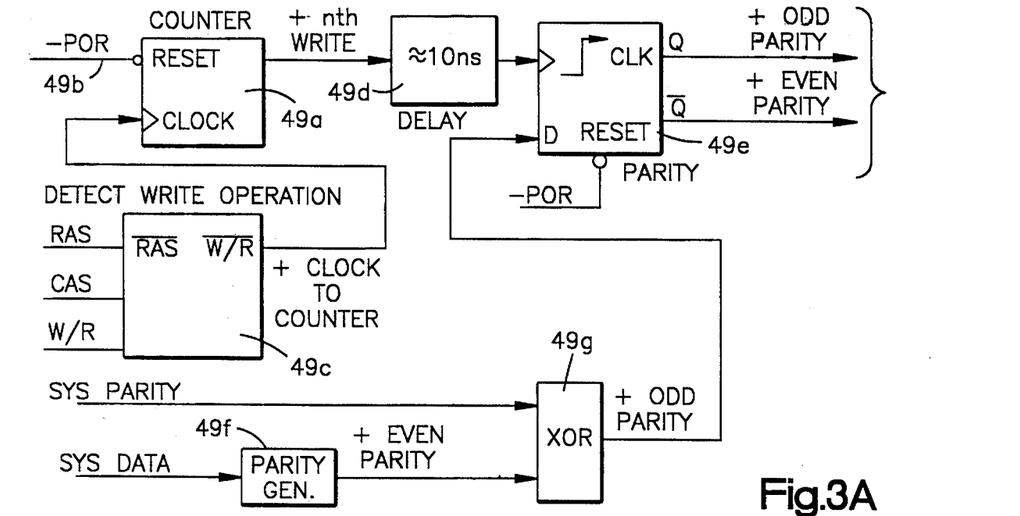
FIG. 3A is a circuit diagram showing the logic for sensing whether the system is generating "even" or "odd" parity.
Figure 3B:
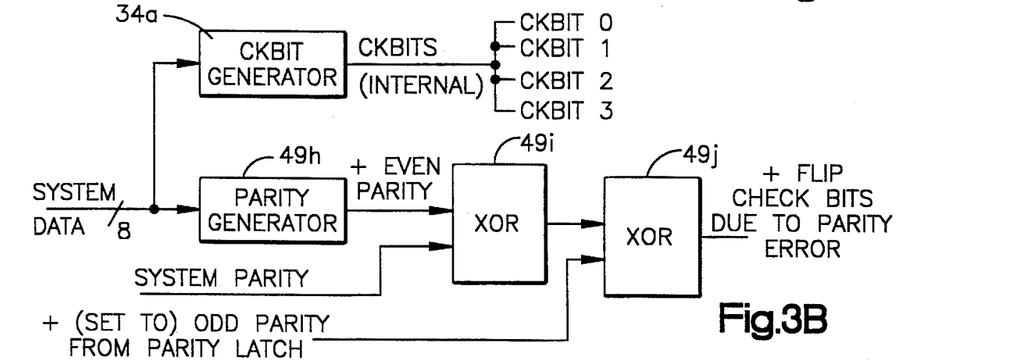
FIG. 3B is a circuit diagram showing the logic for checking parity on a write cycle.
Figure 3C:
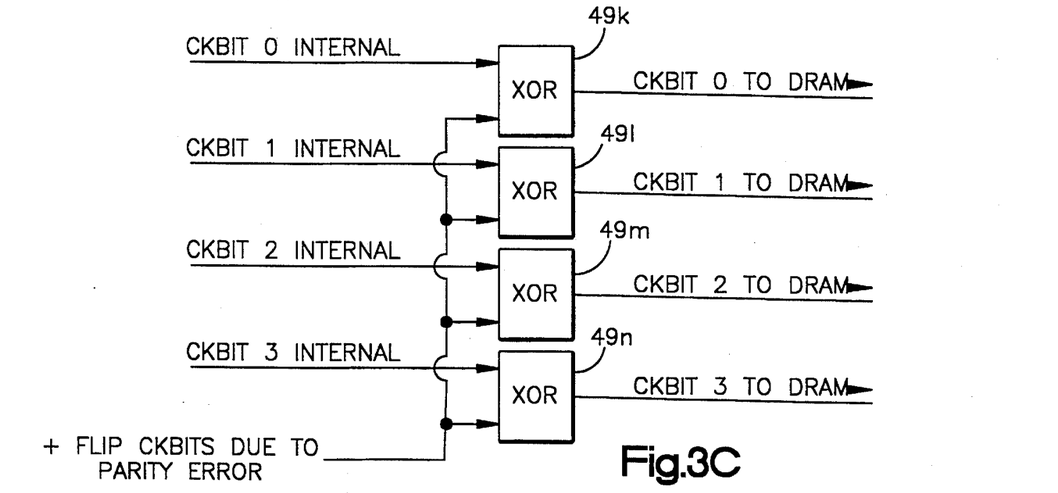
FIG. 3C is a circuit diagram showing the logic for "flipping" the check bits if bad parity is detected.

The circuitry for generating check bits and also for sensing the parity type of the system parity generation and checking the parity of the data is shown in FIGS. 3A–3C. The data bits DQ0 through DQ7 and parity bit PQ8 are received by ASIC chip 32a. The ASIC chip 32a senses and checks parity as will be described presently, and the data bits DQ0–DQ7 are supplied to a check bit generator 34b (FIG. 3B) which generates 4 check bits. The check bits are supplied together with the 8 memory data bits to a 12-bit bus line 36a, and the data bits are then stored in the DRAMs 28a, 28b, 28c. As indicated above, each DRAM is 1M×4 so that 4 of the data bits are stored in DRAM 28a, 4 data bits are stored in DRAM 28b and the 4 check bits in DRAM 28c. The error correction algorithm is shown in Table I below. In this table, the data bits which participate in generating each check bit are shown and marked with an "X".

TABLE I

| Data Bit | 7 | 6 | 5 | 4 | 3 | 2 | 1 | 0 |
|---|---|---|---|---|---|---|---|---|
| Check Bit 0 |   | X |   | X | X |   | X | X |
| Check Bit 1 |   | X | X |   | X | X |   | X |
| Check Bit 2 | X |   |   |   | X | X | X |   |
| Check Bit 3 | X | X | X | X |   |   |   |   |

The handling of the parity is as follows: since the ECC does not store a parity bit per se, each access must handle parity bit generation on the fly. For read operations, the parity bit is generated from the 8 data bits and is not affected by the check bits unless an uncorrectable error occurs in which case bad parity is flagged to the CPU. On a write operation, parity is checked on each byte, every single write cycle. The reason for this can be understood by comparing the ECC parity bit handling according to this invention with a typical ×36 SIMM's parity handling. In a typical ×36 SIMM, the parity bit is just another "data" bit and, if bad parity is sent on a store operation, it will remain in memory as bad parity. On any subsequent read of that data, bad parity will be presented to the system and recognized. In the ECC, the parity bit is not used at all to generate the check bits and is not stored. Therefore, if parity were not distinctly checked and accounted for, a write with bad parity would be stored in memory with correctly generated check bits for the incorrect data pattern. Then, the subsequent access of that data would see a new parity bit generated and the data would be sent back to the system with correct parity on incorrect data. The effect is to change a detectable error into an undetectable one. Since this is clearly not a desirable effect, the parity is checked on every write and if an error is detected, the check bits are manipulated such that on the subsequent read of that data, an uncorrectable error syndrome is generated and bad parity is guaranteed to be sent back to the system, regaining the data integrity that is required. The manipulation of the check bits in the preferred embodiment is to "flip" each check bit to its inverted logic state. As will be seen presently, this will have the effect of causing the subsequently generated syndrome bits to show an uncorrectable error.

The logic for sensing the system parity and for checking the parity of the stored data word written, and inverting or flipping the check bits if bad parity is detected is shown in FIG. 3A. In the illustrated embodiment, the parity (i e., "even" or "odd") of the system is sensed during initialization and latched in for subsequent operations. As shown in FIG. 3A, a counter 49a is provided which has a reset input which is actuated by power on reset (POR) signal 49b and also receives signals from write operation detect logic 49c which receives CAS, RAS and W/R signals which in a certain combination initiates a write operation. The output from the counter 49a is supplied to a delay circuit 49d, which in the disclosed embodiment is a 10 ns delay circuit. The output from the delay circuit 49d is sent to a parity latch 49e. A parity generator 49f is also provided which receives each byte of data and generates a predetermined parity (either odd or even) from the eight bits in the byte. In this embodiment, even parity is generated, but it could be odd parity if desired. The output parity bit (either a "1" or "0") is delivered to an XOR gate 49g where it is XOR'd with the parity bit generated by the CPU system parity generator 13. The output from the XOR gate 49g (either a "1" or "0") is supplied to an input of parity latch 49e along with the output of the delay logic 49d. The output of the latch 49e is then determinative of whether the system is "even" parity or "odd" parity, the circuit having performed this determination in the following manner.

When the power on Reset (POR) is activated indicating that the system has been turned on, this signal (which is generated by the chip in a conventional manner), together with a signal from the detect write operation is supplied to the counter 49c. This assures that the system is activated and is in a write configuration. Preferably, the counter is a single latch which counts to "1" although counter numbers could be as high as $2^{23}$. This count is to assure that valid data with generated parity is being sent to the chip from the system. The sensing is based on the assumption that the data received during power up has "good" parity as received, be it "odd" or "even" parity, and it is this sensed parity which is used to subsequently determine whether there is good parity or bad parity in any received byte, and also to generate the correct (either "even" or "odd") parity during the read cycle. At the same time, system data is being inputted to the parity generator 49f which is set arbitrarily to generate either "even" parity or "odd" parity. In the disclosed embodiment, the parity generator 49f generates even parity. The output from parity generator 49f and the system parity is inputted to XOR gate 49g. If the system parity is even, then the XOR gate 49g will generate a "0" indicating even parity; if the system generated "odd" parity the output for XOR gate 49g will be logic "1", indicating the system is generating "odd" parity. This output is inputted to parity latch 49e; and when the latch is activated by the signal from the delay circuit 49d, the output from the latch is Q if the system is odd parity and $\overline{Q}$ if the system is generating even parity. This parity is latched during the operation until the system is turned off.

The output from the latch 49e is used to flag or identify bad parity on system bits by the logic shown in FIG. 3B. In FIG. 3B showing the data write logic, each data eight-bit word is supplied to the check bit generator 34a and also to a parity generator 49h which generates even parity which is supplied to XOR gate 49i. The parity bit ("0" or "1") supplied by the system is also supplied to XOR gate 49i. The output of XOR gate 49i is supplied to XOR gate 49j. If the system parity is even and correct, the output of XOR gate 49*i* is a logic "0" and if the system parity is odd and correct, the output of XOR gate 49*i* is a logic "1". XOR gate 49*j* XOR's the output from XOR gate 49*i* with the setting output of the latch 49*e*. If the system parity is set to even parity and the correct parity is sensed by the XOR gate 49*i*, then the logic "0" is output from XOR gate 49*j* since logic "0's" are received from both the latch 49*e* and XOR gate 49*i*. Similarly, if the system parity is odd and the output of XOR gate is good, parity is detected as a logic "1" and the input from latch 49*e* to XOR gate 49*j* is also a logic "1".

Thus, in either case, whether the system is generating "odd" parity or "even" parity, the output from XOR gate 49*j* is a logic "0" indicating good parity. Conversely, assuming that this received system parity is bad parity, then if the system is generating even parity it will be received as odd parity, which will be different from the even parity which is generated from the byte by parity generator 49*h*. These will then be outputted from XOR gate 49*i* and inputted to XOR gate 49*l* as a logic "1". XOR gate 49*j* is receiving even parity from the latch 49*e* as a logic "0" which causes the XOR gate to output a logic "1" indicating bad parity, which will invert or "flip" the check bits as previously described. Similarly, if the system is generating "even" parity, the logic of the XOR gates 49*i* and 49*j* will generate a logic "1" or bad parity if bad parity is received from the system.

The circuit for inverting or flipping the check bits is shown in FIG. 3C. As shown herein, each of the check bits 0–3 from the check bit generator 34*a* is inputted to one of XOR gates 49*k*, 49*l*, 49*m*, 49*n*, respectively. Also, the output from XOR gate 49*j* is inputted to each XOR gate 49*k*, 49*l*, 49*m*, 49*n*. If the output is bad parity, it will flip each of the check bits from either a "0" to "1" or a "1" to a "0". "Flipped" check bits indicate bad parity. Hence both manipulated check bits and data bits are stored in DRAM memory, with one type of manipulated check bits indicating bad parity.

The output from parity latch 49*e* is also used in the generation of parity on the read cycle as will be described presently.

Figure 4:
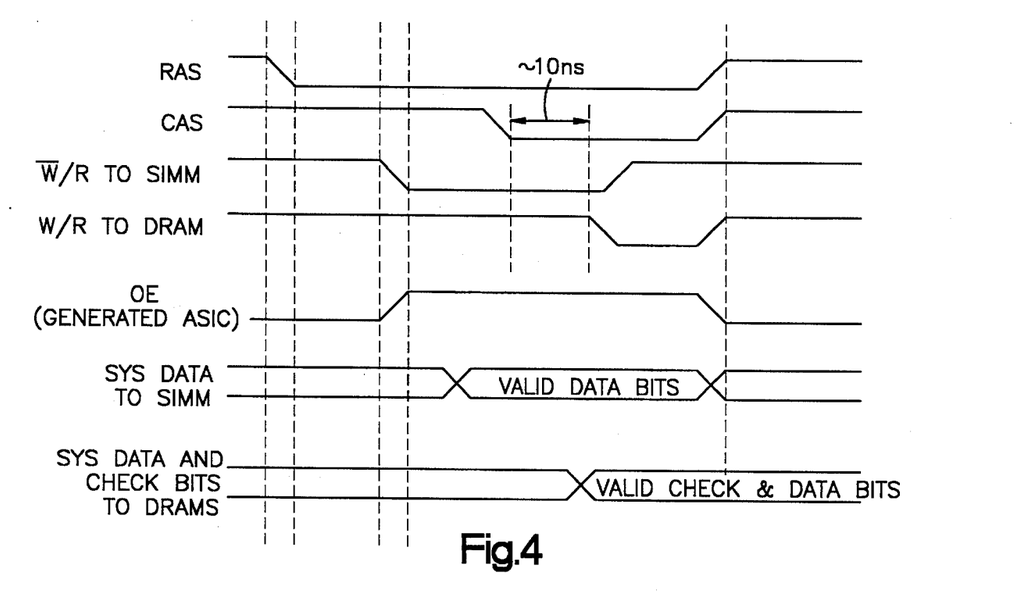
FIG. 4 is a timing diagram of certain signals used on the write cycle.

The timing for generating and storing the check bits together with the data bits is crucial and can best be understood by reference to the timing diagram shown in FIG. 4. In FIG. 4, the timing diagram shows the RAS, CAS, W/R to SIMM, W/R DRAM, OE, the system data to SIMM and system data and check bits to the DRAMs. W/R to SIMM is the signal from the memory controller to the SIMM and the W/R to DRAM is the "late" write enable signal to the DRAM. In order for the error correction code to operate within a single write operation cycle of the SIMM without requiring wait states and to be able to read the check bits, generate syndrome bits and correct data, it is necessary that the DRAMs 28*a*–28*l* operate at a faster speed than the operating speed of the SIMM itself. SIMM architecture standards are, in general, governed by JEDEC (Joint Electronic Device Engineering Council) standards. Industry standards for timing are based on the JEDEC architecture standards. According to one conventional industry standard, either a read operation or a write operation based on the timing of the signals must be completed within 70 nanoseconds. However, the JEDEC industry standards do not presuppose error correction taking place, and thus in order to stay within this parameter, it is necessary to perform the error correction function within the time limit normally allocated to merely read and write and perhaps check parity. To accomplish this, DRAM chips are selected which have a faster operating speed than the speed of the SIMM by at least about 10 nanoseconds. Thus, for a SIMM which has an operating time or parameter of 70 nanoseconds for a read operation or write operation, the DRAM must operate at about 60 nanoseconds or faster.

Referring now to FIG. 4, after RAS goes low followed by the W/R to SIMM going low when CAS goes low valid data will appear on the bus from the memory controller 20 to memory subsystem 22. To assure a read cycle does not occur, the OE signal from ASIC chip 32*a* is used to tristate the DRAM I/O's before the W/R to SIMM goes low. However, this data cannot be latched into memory until the check bits are generated, which requires a certain finite amount of time. Thus, to this end, as indicated above, the late write cycle on the DRAM is used. This is done by maintaining the W/R to DRAM line high for about 10 nanoseconds after CAS has gone low. During this 10 nanoseconds, check bits are being written. At the end of these 10 nanoseconds when the W/R to DRAM goes low, both the data bits and the check bits are latched into DRAMs 28*a*, 28*b*, 28*c* as indicated before. This is shown in the system data-to-SIMM and system data-to-DRAM lines wherein it is shown that valid data write takes place when the CAS goes low, but the valid data and check bits do not appear until the write to DRAM line has gone low. These data bits and check bits are latched in DRAMs 28*a*–28*c*.

Figure 5:
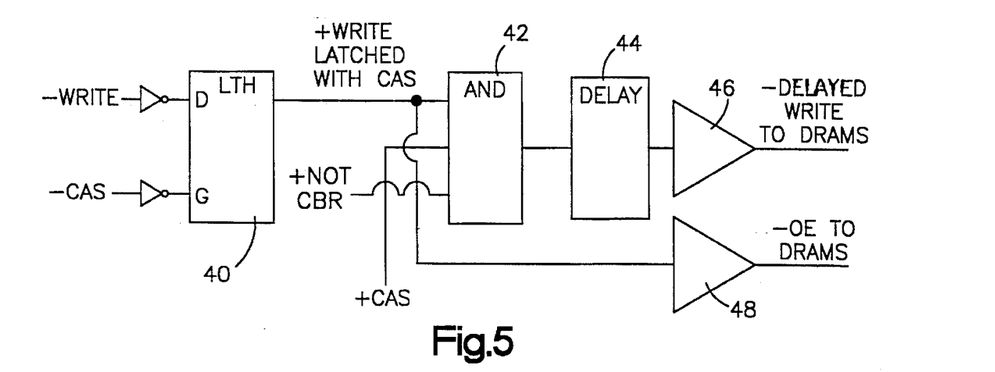
FIG. 5 is a block diagram of the components to do a late write function.

The logic to perform this and to manipulate the check bits for bad parity is shown in FIG. 5, wherein the W/R to SIMM line and the CAS lines are shown going to a latch 40. The output from the latch 40 is supplied as a +write latched together with CAS to an AND gate 42, the output of which is supplied to a delay block 44 and thence to a driver 46 the output of which is the delayed write to DRAM. Also, inputs to the AND gate are a +not CBR (CAS before RAS) and also a +CAS input. The +write latched with CAS is also supplied to a second driver 48 so as to provide an OE signal to the DRAM.

The reason for and functioning of this circuit are as follows. Typically, the W/R to SIMM must be valid and often only is valid before CAS falls and then held for about a maximum of 15 ns after CAS falls. A straight delay on W/R to SIMM would not be wide enough to write data. Hence, this is written to the latch 40, and when CAS falls, the latch samples the signal on W/R to SIMM line. The latch 40 maintains the data valid as long as CAS stays low.

The latch 40 is transparent, so what is impressed on the input of the latch 40 appears at the output which is a write enable as CAS goes low, and will stay as an output as long as CAS is low. In this state, the data flows through the latch 40 and thus the need for the delay. The AND gate 42 operates to block signals before CAS becomes active. The delay block 44 provides the necessary time to generate the check bits before the data is latched into memory. The time of delay is less than 20 ns, typically 7–9 ns. The +CAS and not CBR (CAS before RAS) signals are impressed on the input of the AND gate 42 so that data will not be written on a refresh cycle if CAS is low during a refresh mode done as CBR. Thus, by utilizing the late write function of the DRAMs together with a DRAM that is faster than the speed of the SIMM, an 8-bit data byte can be written and check bits generated in the normal write operation of the SIMM.

Figure 7:
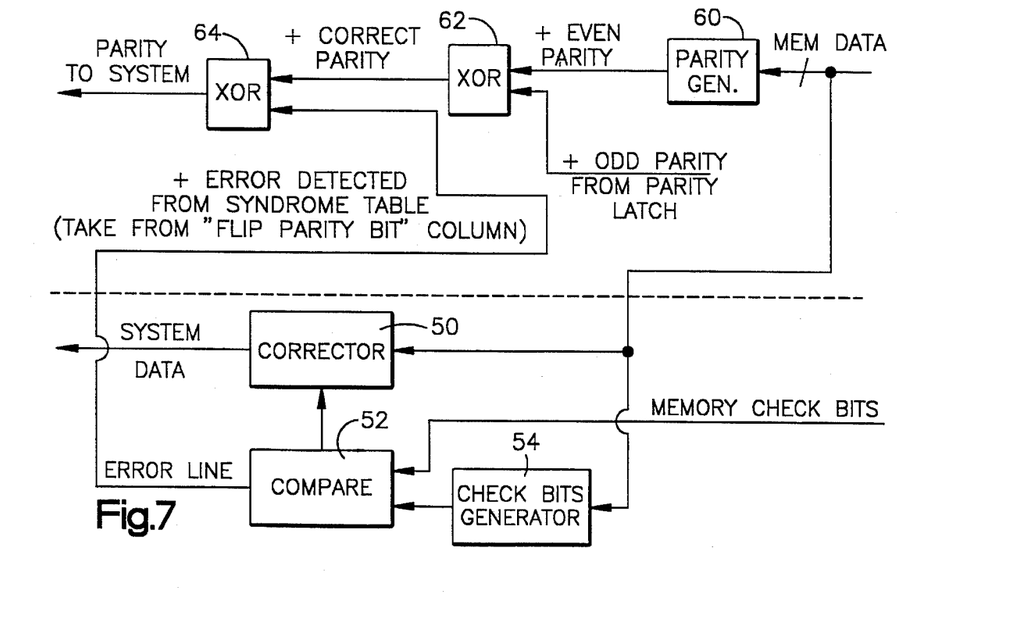
FIG. 7 is a circuit diagram showing the logic for regeneration of check bits, generation of syndrome bits, and correcting single-bit errors and delay some multi-bit errors and generating parity from the stored data.

The data when read on a read operation goes through logic which generates new check bits, compares the newly-generated check bits with the stored check bits and then writes a syndrome table which is the well-known manner of error correction of single-bit errors and detection of some multi-bit errors. This also has to be done within the time standard set for the SIMM card. Once again, there is a need for the fast DRAM, the DRAM being at least 10 nanoseconds faster than the SIMM. The circuitry for the error correction code is shown in FIG. 7 wherein the 8 bits of memory data constituting a data byte are read from memory to a corrector 50. At the same time, the 4 stored check bits that have been stored with the 8 bits of data memory are impressed on a comparitor 52. The 8 memory data bits are also impressed on a check bit generator 54 which regenerates the check bits based on the stored 8 bits of data. These regenerated check bits are also supplied to the comparitor 52 where the originally-generated and stored check bits are compared with the newly-generated check bits to generate syndrome bits. The syndrome bit table and the errors which they indicate are shown in Table II below.

TABLE II

| Syndrome 3210 | Bit in Error | Action | | |
|---|---|---|---|---|
| | | Toggle Data | Toggle Parity | Error Output |
| 0000 | None | N | N | N |
| 0001 | Check Bit 0 | N | N | Y |
| 0010 | Check Bit 1 | N | N | Y |
| 0011 | Data Bit 0 | Y | Y | Y |
| 0100 | Check Bit 2 | N | N | Y |
| 0101 | Data Bit 1 | Y | Y | Y |
| 0110 | Data Bit 2 | Y | Y | Y |
| 0111 | Data Bit 3 | Y | Y | Y |
| 1000 | Check Bit 3 | N | N | Y |
| 1001 | Data Bit 4 | Y | Y | Y |
| 1010 | Data Bit 5 | Y | Y | Y |
| 1011 | Data Bit 6 | Y | Y | Y |
| 1100 | Data Bit 7 | Y | Y | Y |
| 1101 | Multi Bit Error | N | Y | Y |
| 1110 | Multi Bit Error | N | Y | Y |
| 1111 | Multi Bit Error | N | Y | Y |

The syndrome bits are generated by XORing each newly-generated check bit with the comparable stored check bit If they are all "O"s, the syndrome bits as shown in the table will be 0000, which will indicate that there is no error. Single bit errors will show up as various syndrome bit patterns. It will be noted that all single-bit errors can be detected and hence corrected. Certain multi-bit errors can be detected which are shown in the syndrome table as syndrome 1101, 1110 and 1111. These all indicate multi-bit, and hence uncorrectable, errors. (It should be noted that if desired a 4-bit ECC code for a single byte can be used to detect all two bit errors but not correct them—but it cannot both correct all single bit errors and detect all two bit errors.) With respect to the parity handling, if a parity error on the write cycle was detected, then the check bits generated were all "flipped." Hence, in this case, when the check bits are regenerated, and not "flipped" during a read cycle the XORing will cause a syndrome bit pattern of "1111" indicating an uncorrectable error. The syndrome bits are impressed on the corrector 50 and if any bit needs to be corrected because of a single-bit error, that particular bit is "flipped". The corrected data is delivered out as system data in 8 bits out to the system bus.

During the read cycle parity is also generated so that any error involving an odd number of bits occurring in the transmission of the data bytes to the system can be detected by the system as parity error. Again, it does not matter whether the system is an "even" parity or "odd" parity system. The logic for this is shown in FIG. 7, and includes a parity generator 60 which receives each eight-bit data word as it is received from memory and generates even parity, which is inputted to XOR gate 62. The output of parity latch 49e is also impressed on XOR gate 62. If the latch 49e has sensed even parity, a logic "0" will be impressed and the output of the XOR gate 62 will be logic "0". If the sensed system parity by the latch 49h is "odd", the XOR gate 62 will generate a logic "1" which indicates "odd" parity. In either case, the parity output from XOR gate is the proper parity for the system as received by latch 49e. The output of XOR gate 62 is inputted to XOR gate 64 along with the output of comparitor 52. Block 60 generates (arbitrarily) "even" parity for the memory read data. XOR gate 62 adjusts the parity if the SIMM has sensed that it is in an "odd" parity system. XOR gate 64 inverts the correct parity coming out of XOR gate 62 according to the "toggle" column of Table II. Comparitor 52 provides the logic to do the "toggle parity" column. The toggle logic performs in the following manner. If the corrector 50 corrects a single bit error in a data byte by flipping that bit, the generated parity bit, which was generated using the uncorrected data, must also be "flipped" by output to XOR gate from the comparitor 52. However if an error is detected in a check bit according to the syndrome table, this will not affect the parity since generating parity does not involve check bits. The final correct parity (good or bad) is delivered to these memory controller 20 from XOR gate 64. If a single bit or other odd number of bit error occurs in transferring the data from the SIMM to the system, or if uncorrectable error of read data is detected, the system parity generating check 13 will detect such an error in a conventional manner.

Figure 6:
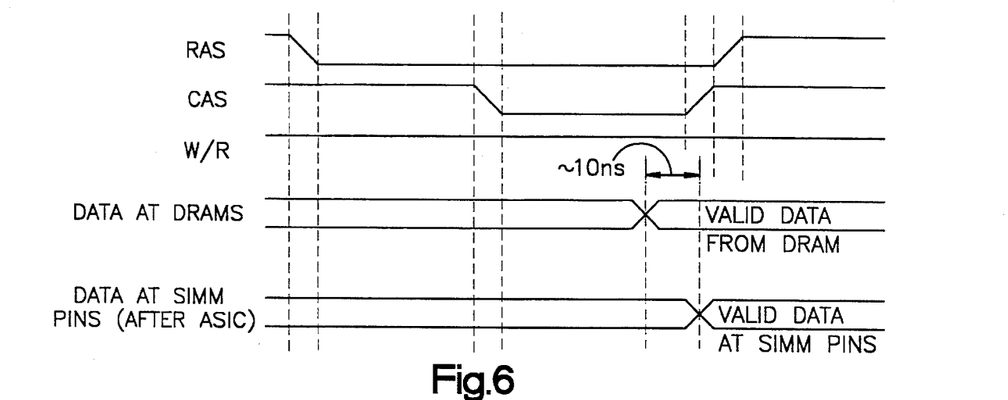
FIG. 6 is a timing diagram of the read cycle.

The signal diagram for this is shown in FIG. 6. When the RAS goes low followed by CAS going low and the W/R to SIMM being high, data is read from the DRAMs and because it can be read in 60 nanoseconds as shown on the RAS line, there is an additional 10 nanoseconds available for the generation of the additional check bits, the generation of the syndrome bits and error correction which is shown as the 10 nanosecond delay. After the specified CAS access time ($T_{CAC}$), the data at the SIMM can be latched as corrected data and impressed on the bus to the memory controller 20.

Thus it can be seen that by providing DRAMs which can operate faster than the operation cycle time of the SIMM according the JEDEC or whatever other standard to which it has been manufactured, error correction can be performed on each byte of data independently. Hence, such a SIMM can be utilized in a wide variety of computer systems which do not have the wait states necessary to perform read-modify-write operations and which write multi-byte data words and which allows error correction to take place on the add-on SIMM even when the computer system is not configured to include error correction.

Again, it should be noted that the present invention is not limited to the particular SIMM as shown and described, but is applicable to SIMMs have various form factors. All that is required is that the DRAM on the SIMM be able to operate at least about 10 nanoseconds faster than the operating time of a read or write operation of the SIMM. The error correction function thus can be afforded to any system which writes one or more data bytes irrespective of the width or number of bytes in a data word. Of course, there is some penalty for utilizing 4 bits of error correction for each 8 bits of a data word; i.e., there is a somewhat increased amount of storage space necessary as opposed to utilizing a 32/7 or 64/8 algorithm of generating check bits. However, the advantage is that these SIMMs can be used in many systems, including those which do not have the necessary wait states for a read-modify-write and thus has wide applicability in retrofitting systems which do not have error correction code on board.

Also, it is to be understood that the invention can be performed generating more than 4 check bits; e.g., 5 check bits. In such a case, more types of errors can be detected and/or corrected. This would require additional memory space and logic for each check bit which could be supplied by additional x1 DRAMs. At least 4 check bits are necessary to correct all single bit errors.

In another embodiment, this technique can be used on SIMMs which do not do either ECC or store parity bits to make them compatible with systems that generate and check either odd or even parity. In such an implementation, the parity of this system is sensed and latched in the manner as described above. This latched parity sense is then used in combination with a parity generator which receives read stored data to deliver data with correct parity to the system. It should be noted however, that bad or corrupted data that is stored will not be detected, and system will react as if it were uncorrupted. What this embodiment does is allow the system to "see" some parity so it will operate, even with some corrupted or bad data.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A SIMM memory adapted to be added as add-on memory to a computer system, which system writes eight-bit bytes of data together with a parity bit and wherein said system writes one of either "even" parity or "odd" parity, and said SIMM provides error correction and parity check for said data; and wherein said SIMM is configured to operate at a given speed for read and write operations, comprising:

logic to generate check bits from the data bytes written; logic to sense whether the system is utilizing "odd" or "even" parity; logic to generate parity bits and compare the generated parity bits with the system parity bits and manipulate the check bits to show uncorrectable error when bad parity is detected responsive to either "even" or "odd" sensed parity; DRAM chips to store said generated check bits with the data bytes in said DRAM chips;

logic to read said data bytes and associated check bits from the DRAM chips and generate new check bits and compare the newly-generated check bits with the stored check bits to correct and output all single-bit errors and detect some multi-bit errors and bad parity in the read data; and logic to write parity bits to said computer system from said read data bytes responsive to and corresponding to the sensed parity type of said system;

whereby a given SIMM can be added to either an "even" parity or "odd" parity system.

2. The invention as defined in claim 1 wherein said check bits are manipulated by having at least one generated check bit inverted responsive to bad parity written by the SIMM on the write operation.

3. The invention as defined in claim 2 wherein said check bits are manipulated by having a plurality of check bits manipulated responsive to bad parity.

4. The invention as defined in claim 2 wherein said check bits are manipulated by having all check bits inverted responsive to bad parity.

5. The invention as defined in claim 1 wherein the logic to sense the type of parity the system utilizes includes logic to determine the system parity during initialization and latch in the sensed parity.

6. A computer system comprising:

a CPU and a bus having a SIMM memory added as add-on memory to said computer system, said computer system configured to write eight bit bytes of data together with a parity bit, and wherein said system writes one of either even parity or odd parity, said SIMM including:
      logic to generate check bits from the data bytes written; logic to sense whether the system is utilizing "even" or "odd" parity, logic to generate parity bits and compare the generated parity bits with the system parity bits and manipulate the check bits to show uncorrectable error when bad parity is detected responsive to either "even" or "odd" sensed parity; DRAM chips to store said generated check bits with each data byte in said SIMM;

logic to read said data bytes and associated check bits from the DRAM chips and generate new check bits and compare the newly-generated check bits with the stored check bits to correct and output all single-bit errors and detect some multi-bit errors and bad parity in the read data and supply said corrected data to the system bus; and logic to write parity bits to said computer system from said read data bytes responsive to and corresponding to the sensed parity type of said system;

whereby a given SIMM can be added to either an "even" parity or "odd" parity system.

7. The invention as defined in claim 5 wherein said check bits are manipulated by having at least one generated check bit inverted responsive to bad parity.

8. The invention as defined in claim 6 wherein said check bits are manipulated by having a plurality of check bits manipulated responsive to bad parity.

9. The invention as defined in claim 6 wherein said check bits are manipulated by having all check bits inverted responsive to bad parity.

10. The invention as defined in claim 6 wherein the logic to sense the type of parity the system utilizes includes logic to determine the system parity during initialization and latch in the sensed parity.

11. A method of providing error correction and parity check on SIMM memory added as add-on memory to a computer system which system writes eight-bit bytes of data together with a parity bit; and wherein said system utilizes either one of odd parity or even parity, comprising the steps of:

generating on said SIMM check bits from the data bytes written; sensing whether the system is writing odd parity or even parity, comparing the parity of the generated parity bit with the system parity bit and manipulating said check bits to show uncorrectable error responsive to bad parity responsive to either "even" or "odd" parity sensed; storing said generated check bits with said data bytes in DRAM chips on said SIMM;

reading said data bytes and associated check bits from the DRAM chips and generating new check bits and comparing the newly-generated check bits with the stored check bits to correct and output all single-bit errors and detect some multi-bit errors and bad parity in the read data;

writing parity bits to said computer system from said read data bytes responsive to and corresponding to the sensed parity type of said system;

whereby a given SIMM can utilize either an "even" parity or "odd" parity system.

* * * * *